(12) United States Patent
Roberts et al.

(10) Patent No.: US 7,317,714 B2
(45) Date of Patent: Jan. 8, 2008

(54) INTERNET CALL WAITING MESSAGING

(75) Inventors: Linda Ann Roberts, Decatur, GA (US); Edward Michael Silver, Atlanta, GA (US); Hong Thi Nguyen, Atlanta, GA (US)

(73) Assignee: AT&T Deleware Intellectual Property, Inc., Wilmington, DE (US)

( * ) Notice: Subject to any disclaimer, the term of this patent is extended or adjusted under 35 U.S.C. 154(b) by 908 days.

(21) Appl. No.: 10/177,181

(22) Filed: Jun. 21, 2002

(65) Prior Publication Data

US 2004/0037266 A1    Feb. 26, 2004

(51) Int. Cl.
H04L 12/66    (2006.01)
H04L 12/28    (2006.01)
H04M 11/00    (2006.01)
H04M 1/06    (2006.01)

(52) U.S. Cl. .................... 370/352; 370/389; 370/351; 379/93.35; 379/142.08; 379/215.01

(58) Field of Classification Search ................ 370/352, 370/400, 401, 389, 493, 494; 379/32.02, 379/84, 88.12, 88.21, 93.09, 93.14, 93.23, 379/93.35
See application file for complete search history.

(56) References Cited

U.S. PATENT DOCUMENTS

| | | | |
|---|---|---|---|
| 3,617,640 A | 11/1971 | Chichanowicz | |
| 4,935,951 A | 6/1990 | Robinson et al. | |
| 4,993,058 A | 2/1991 | McMinn et al. | |
| 5,012,507 A | 4/1991 | Leighton et al. | |
| 5,161,180 A | 11/1992 | Chavous | |
| RE34,677 E | 7/1994 | Ray et al. | |
| 5,511,111 A | 4/1996 | Serbetcioglu et al. | |
| 5,526,406 A | 6/1996 | Luneau | |
| 5,621,379 A | 4/1997 | Collins | |
| 5,673,304 A | 9/1997 | Connor et al. | |
| 5,724,412 A | 3/1998 | Srinivasan | |
| 5,796,806 A | 8/1998 | Birckbichler | |
| 5,805,587 A * | 9/1998 | Norris et al. | ................ 370/352 |
| 5,883,942 A | 3/1999 | Lim et al. | |
| 5,940,474 A | 8/1999 | Ruus | |
| 5,940,475 A | 8/1999 | Hansen | |
| 6,009,148 A | 12/1999 | Reeves | |
| 6,011,473 A | 1/2000 | Klein | |
| 6,104,800 A | 8/2000 | Benson | |
| 6,144,644 A * | 11/2000 | Bajzath et al. | .............. 370/259 |
| 6,208,718 B1 | 3/2001 | Rosenthal | |

(Continued)

OTHER PUBLICATIONS

U.S. Appl. No. 11/318,110, filed Dec. 2005, Lu.

(Continued)

Primary Examiner—Hanh Nguyen
(74) Attorney, Agent, or Firm—Scott P. Zimmerman, PLLC; Geoff Sutcliffe; Jodi Hartman

(57) ABSTRACT

Systems, methods, and apparatuses are disclosed for providing Internet Call Waiting (ICW) Messaging Services. In an embodiment, a calling party places an incoming call to a called telephone number having an active ICW session and data connection. A telecommunications system allows a calling party to communicate an ICW message to a computer system engaged in the ICW session and data connection. The telecommunications system may also allow a called party (e.g., the user of the computer system) to communicate a response to the ICW message and, thus, allow interactive ICW messaging.

20 Claims, 11 Drawing Sheets

U.S. PATENT DOCUMENTS

| | | |
|---|---|---|
| 6,208,726 B1 | 3/2001 | Bansal et al. |
| 6,219,413 B1 | 4/2001 | Burg |
| 6,223,029 B1 | 4/2001 | Stenman et al. |
| 6,259,692 B1 | 7/2001 | Shtivelman |
| 6,307,920 B1 | 10/2001 | Thomson et al. |
| 6,310,946 B1 | 10/2001 | Bauer et al. |
| 6,339,706 B1 | 1/2002 | Tilgren et al. |
| 6,343,115 B1 | 1/2002 | Foldare et al. |
| 6,347,136 B1 | 2/2002 | Horan |
| 6,356,756 B1 | 3/2002 | Koster |
| 6,434,126 B1 | 8/2002 | Park |
| 6,476,763 B2 | 11/2002 | Allen, Jr. |
| 6,487,240 B1 | 11/2002 | Chen |
| 6,529,500 B1 | 3/2003 | Pandharipande |
| 6,603,977 B1 | 8/2003 | Walsh et al. |
| 6,608,886 B1 | 8/2003 | Contractor |
| 6,622,016 B1 | 9/2003 | Sladek et al. |
| 6,624,754 B1 | 9/2003 | Hoffman et al. |
| 6,661,785 B1 * | 12/2003 | Zhang et al. ............... 370/352 |
| 6,665,388 B2 | 12/2003 | Bedingfield |
| 6,665,611 B1 | 12/2003 | Oran et al. |
| 6,674,745 B1 | 1/2004 | Schuster et al. |
| 6,678,357 B2 | 1/2004 | Stumer et al. |
| 6,680,998 B1 | 1/2004 | Bell et al. |
| 6,703,930 B2 | 3/2004 | Skinner |
| 6,718,021 B2 | 4/2004 | Crockett et al. |
| 6,724,872 B1 * | 4/2004 | Moore et al. ............ 379/93.35 |
| 6,771,742 B2 | 8/2004 | McCalmont et al. |
| 6,792,081 B1 | 9/2004 | Contractor |
| 6,804,338 B1 | 10/2004 | Chen |
| 6,816,481 B1 * | 11/2004 | Adams et al. ............... 370/352 |
| 6,842,448 B1 * | 1/2005 | Norris et al. ............... 370/352 |
| 6,868,074 B1 | 3/2005 | Hanson |
| 6,895,002 B2 * | 5/2005 | Shah et al. ................. 370/352 |
| 6,912,399 B2 | 6/2005 | Zirul et al. |
| 6,931,117 B2 * | 8/2005 | Roberts et al. ........ 379/215.01 |
| 6,940,950 B2 | 9/2005 | Dickinson et al. |
| 6,950,861 B1 * | 9/2005 | Amro et al. ................. 709/219 |
| 7,054,428 B1 * | 5/2006 | Berthoud et al. ...... 379/215.01 |
| 2002/0016188 A1 | 2/2002 | Kashiwamura |
| 2002/0025832 A1 | 2/2002 | Durian et al. |
| 2002/0072348 A1 | 6/2002 | Wheeler et al. |
| 2002/0160745 A1 | 10/2002 | Wang |
| 2002/0181691 A1 | 12/2002 | Miller et al. |
| 2003/0211839 A1 | 11/2003 | Baum et al. |
| 2003/0216148 A1 | 11/2003 | Henderson |
| 2004/0037403 A1 | 2/2004 | Koch |
| 2004/0057425 A1 | 3/2004 | Brouwer et al. |
| 2004/0101123 A1 | 5/2004 | Garcia |
| 2004/0140928 A1 | 7/2004 | Cleghorn |
| 2004/0219954 A1 | 11/2004 | Odinak |
| 2005/0047574 A1 | 3/2005 | Reid |
| 2005/0063519 A1 | 3/2005 | James |
| 2005/0151642 A1 | 7/2005 | Tupler et al. |
| 2005/0175166 A1 | 8/2005 | Welenson et al. |
| 2005/0190750 A1 | 9/2005 | Kafka |
| 2005/0190892 A1 | 9/2005 | Dawson et al. |
| 2005/0232243 A1 | 10/2005 | Adamczyk |
| 2005/0250468 A1 | 11/2005 | Lu |

OTHER PUBLICATIONS

US 5,905,788, 05/1999, Bauer et al. (withdrawn)

* cited by examiner

INTERNET CALL WAITING MESSAGING

CROSS REFERENCE

This application relates to applicants' co-pending application Ser. No. 10/176,572 entitled "Caller Control of Internet Call Waiting," filed simultaneously herewith and of which the "Brief Summary of the Invention" and "Detailed Description of the Invention" sections are incorporated herein by this reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention relates generally to the field of communications. More particularly, this invention relates to special services implemented over a telecommunications network that communicate incoming and/or outgoing messages via an Internet Protocol (IP) addressable communications device during a data connection.

2. Description of the Related Art

Telecommunications has experienced explosive growth, and more growth is planned as telecommunication access and numerous communication devices improve. This explosive growth is revolutionizing special services offered to subscribing customers. Of the special service offerings, the most relevant to this invention are the Internet Call Waiting (ICW) services. A user of a personal computer (PC) or other IP communications devices with an active ICW session is able to receive information about incoming calls from a calling telephone number without interrupting an active data connection between the PC and a data network, such as the World Wide Web, an Internet, an Intranet, and an Extranet. Presently available ICW services provide the calling telephone number, a billing name associated with the calling telephone number (if available), and call handling options. Call handling options typically include disabling the ICW session and data connection to answer the call, putting the call on hold and presenting a message to a calling party that a called party is aware of the call and will answer the incoming call shortly, routing the call to a voice mailbox associated with the called telephone number, ignoring the call, and forwarding the call to another telephone number. These options are presented to the user in a Graphical User Interface (GUI) that appears as a pop-up screen with separate command buttons. The user clicks on a desired call handling command button on the screen for the ICW PC software application and the selected option is transmitted to the telecommunications network over the Internet. The telecommunications network then processes the call according to the selected handling option.

Most subscribers of ICW services rely on a single telephone line to make voice calls and to access a data network. When the telephone line is utilized for a data connection (e.g., via modem), an ICW session is often automatically activated by a dialing software, which dials an appropriate prefix code for activating ICW before dialing the telephone number to establish the link with the data network. For example, a user's communications device may dial a telephone number of an Internet Service Provider (ISP) for access to the world wide web including an Internet, Intranet, Extranet, or other data network. Given that there is only one telephone line and ICW has been activated, the user of the connected PC controls how the incoming call is handled. For example, if the user is notified of the incoming call, then the user may choose to not answer the call and maintain an on-line session via the data connection. Consequently, the calling party cannot communicate with the user, such as to provide that user with a short message that the user may use to make an informed decision about how to handle the call. As an example, a parent calling his/her own home telephone number may hear ringing, but no answer, as a consequence of a child's failure to associate the calling telephone number with his/her parent and the child's unwillingness to interrupt or terminate an Internet gaming session and answer the incoming call. As a result, the parent is unable to communicate with his/her child.

Therefore, there is a need for systems and methods that allow a calling party to communicate an incoming message to a communications device at a called number engaged in an ICW session and data connection. Further, there is a need to allow the user of the communications device engaged in the ICW session and data connection to communicate a response message to the calling party, Finally, there is a need to provide several authorization levels for the calling party and/or user to control the messaging capabilities during the ICW session and the data connection.

BRIEF SUMMARY OF THE INVENTION

This invention addresses the above needs by providing a telephony network-based solution that allows a calling party to communicate a message to a communications devices having an IP address (hereinafter referred to as an "IP communications device") engaged in an ICW session and a data connection (also referred to as an on-line session) of a called telephone number. As used herein, the term IP communications device includes a wireless phone, a cellular phone, a satellite phone, a computer, a modem, an audio pager, a personal digital assistant, a WAP phone, a digital signal processor, a global positioning system transceiver, an interactive television, an MP3 player, and other IP addressable communications devices capable of delivering audio, video, and/or data communications. In a preferred embodiment, the IP communications device includes a personal computer (PC) system (also referred to herein as computer system).

In an embodiment, the calling party places an incoming call to a called telephone number that has activated the ICW service(s). A telecommunications network (e.g., a Public Switched Telephone Network (PSTN), a mobile switching network, etc.) detects the incoming call to the called telephone number, decodes a calling telephone number of the incoming call, and retrieves an ICW Messaging Profile associated with the called telephone number and/or calling telephone number. For example, the ICW Messaging Profile may include preferences for enabling ICW messaging between the called telephone number and calling telephone number, such as, for example, automatically enabling ICW messaging, prompting the calling party or a user of the computer system at the called telephone number to activate ICW messaging, presentation format of ICW messaging (e.g., audio, video, text, and/or combinations thereof), automatically enabling response message capabilities for ICW messaging, etc. The telecommunications network may notify the calling party that the called telephone number is engaged in an ICW session. Further, the telecommunications network may prompt the calling party to activate ICW messaging or other call handling options. Alternatively, the ICW Messaging Profile may automatically activate ICW messaging or other call handling options. If ICW messaging is activated, then the telecommunications network associates connectivity requirements of the computer system of the called telephone number so that ICW messaging is enabled. Further, the telecommunications network may associate connectivity requirements of a communications device of the calling telephone number to allow interactive ICW messaging.

In an embodiment, the telecommunications network allows the calling party to interrupt the ICW service(s) and transmit the incoming message. The incoming message may be communicated by temporarily interrupting or pausing an interactive on-line session via the data connection and routing the incoming message to the computer system of the called telephone number over the data connection (e.g., an IP call). Alternatively, the incoming message could be routed to the computer system of the called telephone number over the telecommunications network. With either routing, an ICW Messaging Module of the computer system of the called telephone number presents the ICW messaging so that the use may be alerted of the incoming message associated with the incoming call.

In another embodiment, the telecommunications network allows the user of the computer system of the called telephone number to transmit the response message to the communications device of the calling party. The telecommunications network utilizes a Selection of ICW Messaging Presentation formats (that may be associated with data from the ICW Messaging Profile, the ICW Messaging Module, an incoming caller line identification (ICLID) signal, etc.) so that the response message can be formatted for the calling party's communications device. After the response message is formatted, it is routed through the telecommunications network to the calling party's communications device for presentation.

In another embodiment, this invention makes use of the ICW Messaging Module mentioned above. The ICW Messaging Module comprises computer programs, computer systems, and/or telecommunications systems that allow the user to customize presentation and features of the incoming message(s) and/or response message(s) and that allow the user to control how the data connection is interrupted. For example, the user may select a desired presentation format based upon information associated with an ICW Messaging Profile (e.g., the calling party's telephone number is associated with a personal digital assistant (PDA) and all incoming calls from PDAs are formatted for text-messaging presentation), a name associated with the calling telephone number, a time of day, a date identifier (e.g., day of week or calendar date), other information associated with the ICLID signal, length and/or duration of ICW message(s), display of GUI (e.g., color, font, placement of incoming message on screen, etc.), whether to bookmark a site associated with the active data connection or save information prior to connecting message, and other similar selections. The ICW Messaging Module provides a convenient and user-friendly web-interface that allows the customer and/or user to manage ICW messaging and to specify how to process interrupted on-line sessions. Further, the ICW Messaging Module of the computer system provides the IP address associated with the active ICW session and data connection so that the telecommunications network or data network can communicate the ICW Message(s). The ICW Messaging Module thus integrates telephony events and data network events (such as World-Wide-Web packetized messages) with the computer system at the called telephone number.

In another embodiment, the ICW messaging services may be assigned different levels of access and/or authority for interrupting ICW and the data connection to send the incoming message. For example, Calling Party Mom (i.e., a calling party that is a mother) may have an ICW Messaging Profile associated with her cellular phone number that always allows interruption of ICW services and initiates the ICW messaging services. However, Calling Party Child (i.e., a calling party that is a child) may have an ICW Messaging Profile associated with an access code entered by the child that alerts the user of the computer system that Calling Party Child is trying to send an incoming message and prompts the user of the computer system to accept or to enter an authorization code in order to activate ICW messaging. If the user of the computer system does not accept or enter the authorization code or if the user fails to respond to the authorization prompt within a selected period of time, then the network may default to activate ICW messaging.

Another embodiment describes an apparatus that generates or otherwise transforms the incoming message routed to the computer system to an audible and/or visual announcement that can be presented by the computer system. The apparatus includes a network port, a memory device, and a digital signal processor. The network port receives the incoming message from the telephone network. The memory device stores a selection of announcement formats to accompany the incoming communications signal. The digital signal processor communicates with the memory device and selects an announcement format based upon information contained within the incoming message. The information contained within the incoming message could be associated with telephone network information provided by the telecommunications system. After the announcement format is selected and retrieved from the memory device, the apparatus could also include a system that presents and/or plays the incoming message.

BRIEF DESCRIPTION OF THE DRAWINGS

The above and other embodiments, objects, uses, advantages, and novel features of this invention are more clearly understood by reference to the following description taken in connection with the accompanying figures, wherein.

DETAILED DESCRIPTION OF THE INVENTION

This invention now will be described more fully hereinafter with reference to the accompanying drawings, in which exemplary embodiments are shown. This invention may, however, be embodied in many different forms and should not be construed as limited to the embodiments set forth herein; rather, these embodiments are provided so that this disclosure will be thorough and complete, and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the schematics, flowcharts, block diagrams, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

Figure 1:
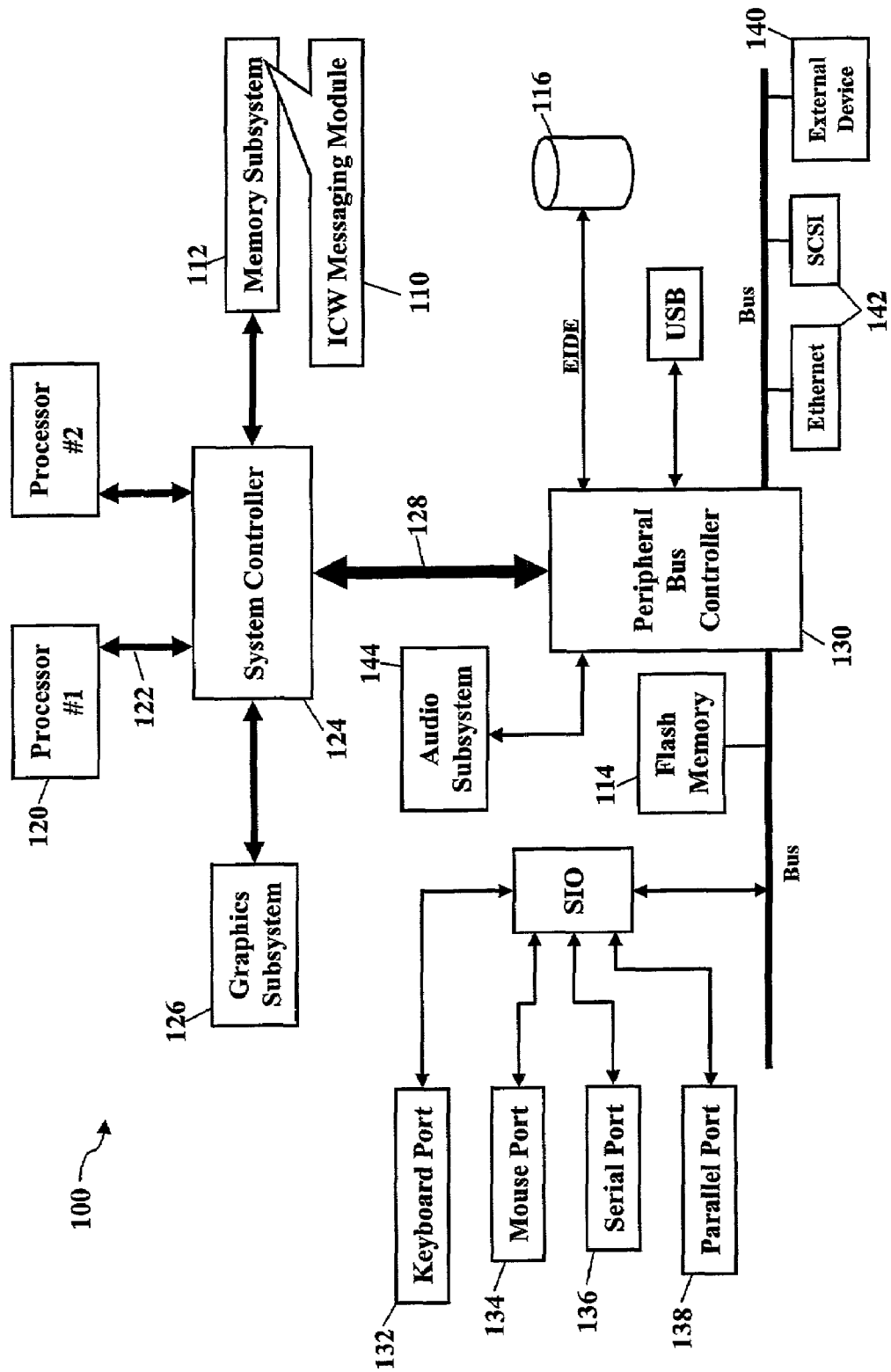
FIG. 1 is a block diagram showing of the ICW Messaging Module that resides in a computer system according to an embodiment of this invention.

Referring now to the figures, FIG. 1 is a block diagram showing an ICW Messaging Module 110 residing in a computer system 100. The ICW Messaging Module 110 operates within a system memory device. The ICW Messaging Module 110, for example, is shown residing in a memory subsystem 112. The ICW Messaging Module 110, however, could also reside in flash memory 114 or peripheral storage device 116. The computer system 100 also has one or more central processors 120 executing an operating system. The operating system, as is well known, has a set of instructions that control the internal functions of the computer system 100. A system bus 122 communicates signals, such as data signals, control signals, and address signals, between the central processor and a system controller 34 (typically called a "Northbridge"). The system controller provides a bridging function between the one or more central processors 120, a graphics subsystem 126, the memory subsystem 112, and a PCI (Peripheral Controller Interface) bus 128. The PCI bus 128 is controlled by a Peripheral Bus Controller 130. The Peripheral Bus Controller 130 (typically called a "Southbridge") is an integrated circuit that serves as an input/output hub for various peripheral ports. These peripheral ports could include, for example, a keyboard port 132, a mouse port 134, a serial port 136 and/or a parallel port 138 for a video display unit, one or more external device ports 140, and networking ports 142 (such as SCSI or Ethernet). The Peripheral Bus Controller 130 could also include an audio subsystem 144.

The processor 710 is typically a microprocessor. Advanced Micro Devices, Inc., example, manufacture a full line of ATHLON™ microprocessors (ATHLON™ is a trademark of Advanced Micro Devices, Inc., One AMD Place, P.O. Box 3453, Sunnyvale, Calif. 94088-3453, 408.732, 2400, 800.5128.8450). The Intel Corporation also manufactures a family of X86 and P86 microprocessors (Intel Corporation, 2200 Mission College Blvd,. Santa Clara, Calif. 95052-8119, 408.765.8080). Other manufactures also offer microprocessors. Such other manufactures include Motorola, Inc. (1303 East Algonquin Road, P.O. Box A3309 Schaumburg, Ill. 60196), International Nusiness Machines Corp. (New Orchard Road, Armonk, N.Y. 10504, (914) 499-1900), and Transmeta Corp. (3940 Freedom Circle, Santa Clara, Calif. 95054).

The preferred operating system is WINDOWS™ (WINDOWS™ is a registered trademark of Microsoft Corporation, One Microsoft Way, Redmond Wash. 98052-6399, 425.882.8080. Other operationg systems, however, are also syitable. Such otehr operating systems would include the UNIX™ operating system (UNIX™ is a registered trademark of the Open Source Group, the UNIX-based Linux operating system, WINDOWS NT™, and Mac™ OS (Mac™ is a registerd trademark of Apple Computer, Inc., 1 Infinite Loop, Cupertino, Calif. 95014, 408.996.1010.

The system memory device (shown as memory subsystem 112, flash memory 114, or peripheral storage device 116) may also contain an application program. The application program cooperates with the operating system and with a video display unit (via the serial port 136 and/or the parallel port 138) to provide a GUI for the ICW Messaging Module 110. The GUI typically includes a combination of signals communicated along the keyboard port 132 and the mouse port 134. The GUI provides a convenient visual and/or audible interface with the customer or user of the computer system 100. As is apparent to those skilled in the art, the selection and arrangement of the ICW Messaging Module 110 to manage ICW Messaging Services may be programmed over a variety of alternate mediums, such as, for example, a voice-activated menu prompt, an interactive session with an telecommunications network administrator, and the like.

The ICW Messaging Module 110 allows a user to manage ICW messaging services, such as (1) allowing the user to customize presentation and features of the incoming message(s) and/or response message(s) and (2) allowing the user to control how the data connection is interrupted. For example, the user may select a desired presentation format presented by computer system 100 or an alternate IP communications device servicing a called telephone number (or to a Service Node address). The desired presentation format may be based upon information associated with an ICW Messaging Profile, a name associated with the calling telephone number, a time of day, a date identifier (e.g., day of week, calendar date, etc.), other information associated with the ICLID signal, length and/or duration of an incoming message(s) and/or outgoing message(s), display of GUI (e.g., color, font, placement of ICW Messaging Module on display device, etc.), etc. The ICW Messaging Module 110 also allows the user to customize features, such as call handling options and other special services that may be provided with the incoming message. For example, the ICW Messaging Module may present the incoming message(s) and also allow the user to answer the call (or place the call in voicemail, etc.). Further, the ICW Messaging Module 110 allows the user to control how the data connection is interrupted, paused, and/or suspended during ICW messaging. Since the ICW messaging makes use of TCP/IP or other similar technology, an on-line session of the data connection (e.g., checking e-mail, playing a game, reading an article, etc.) may be suspended or interrupted while the ICW message is communicated and/or responded to. For example, if the user was reading an on-line article when the incoming call was received, the user could answer the incoming call, and then, after hanging-up, the user could return to reading the article after the incoming call was terminated. In an embodiment, the interruption control of the ICW service functions to provide a book-marking feature and/or otherwise remembers the web address. Still further, the interruption control of ICW may also save information input by the user, so that the user does not data or other information input by the user. Thus, the ICW Messaging Module provides a convenient and user-friendly interface that allows the customer and/or user to manage ICW messaging services. Finally, the ICW Messaging Module of the computer system provides the IP address associated with the active ICW session and data connection so that the telecommunications network or data network can communicate the ICW Message(s). The ICW Messaging Module thus integrates telephony events and data network events with the computer system at the called telephone number.

Figure 2:
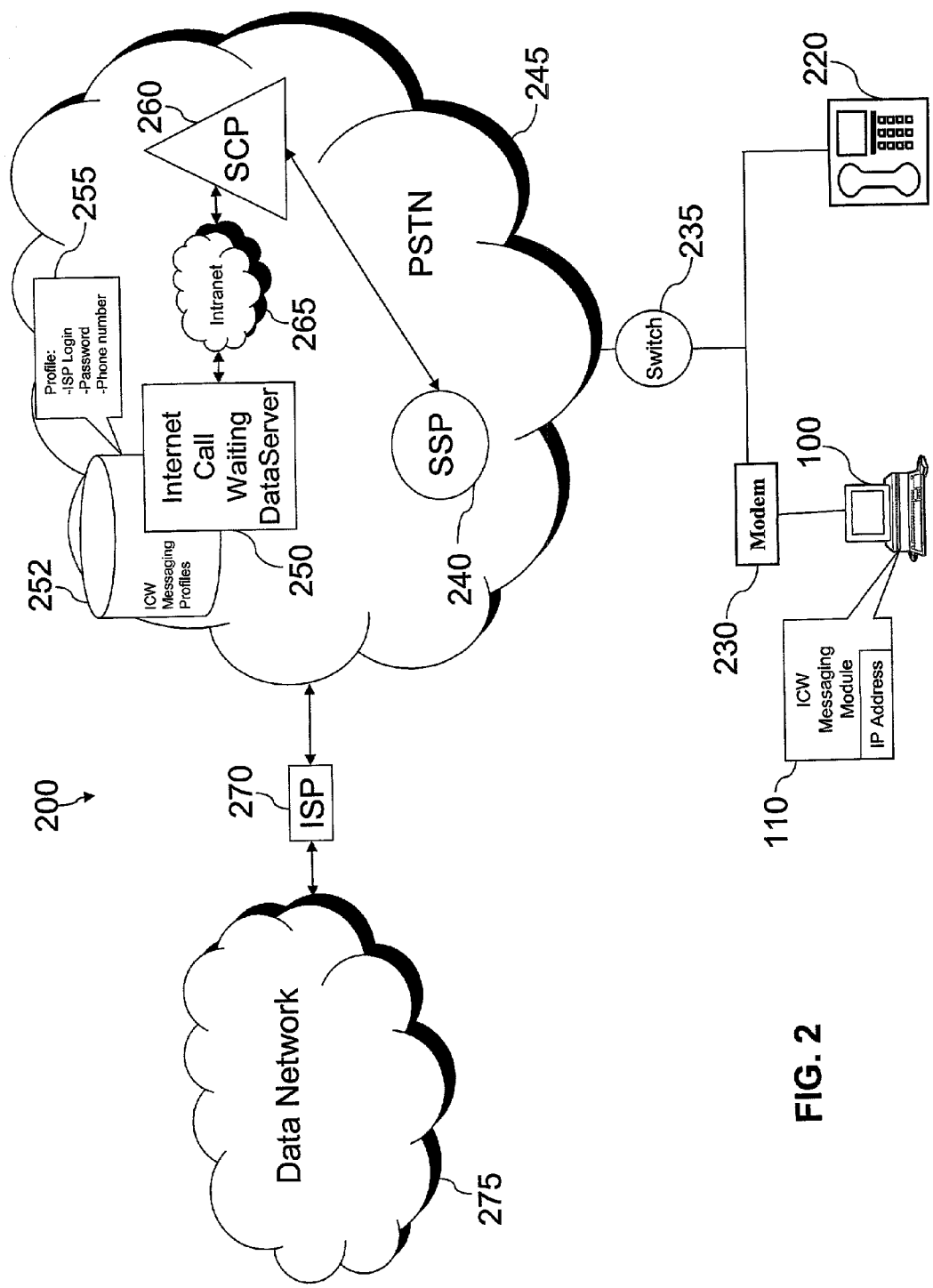
FIG. 2 is a schematic of a telecommunications system showing a computer system engaged in an ICW session and a data connection according to an embodiment of this invention.

FIG. 2 is a schematic showing the ICW Messaging Module 110 operating within a telecommunications system 200 according to an embodiment of this invention. The telecommunications system 200 includes the computer system 100, the ICW Messaging Module 110 (including the IP address associated with the ICW session and data connection) residing within computer system 100, a POTS telephone 220, a modem 230, a telecommunications switch 235, a Public Switched Telephone Network (PSTN) 245 including a service switching point (SSP) 240, an Internet Call Waiting (ICW) DataServer 250 including a database of ICW Messaging Profiles 252 and a Profile 255, a service control point (SCP) 260, and an Intranet 265, an Internet Service Provider (e.g., America On-Line) 270, and a data network 275.

Typically, a subscribing customer (i.e., a customer of the ICW Messaging Services) or the user at the customer's premises has access to the computer system 100 and/or the telephone 220. For example, if a user wishes to call a particular telephone number, the user may use telephone 220 to dial the telephone number and establish a voice connection. If, however, the user wishes to send, receive, or access voice, video, and/or data (e.g., read and respond to e-mail, order products, view video-clips, listen to music, engage in an interactive gaming session, etc.), then modem 230 allows the computer system 100 to access the data network 275 via the PSTN 245. To facilitate the data connection through modem 230 and Internet Service Provider (ISP) 270, the computer system 100 typically uses Internet browsing software (or other appropriate software to manage the data connection), such as, for example, MICROSOFT EXPLORER® or NETSCAPE NAVIGATOR®.

Whether the user is attempting to make a voice connection or a data connection, each telephone number dialed from the customer's premises is sent to the PSTN 245 via switch 235. Thereafter, the PSTN 245 connects the outgoing call to a dialed telephone number (or to another Service Node address) to establish the voice connection (not shown) or to the ISP 270 to establish the connection with the data network 275. Communications signals sent from the customer's premises arrive at SSP 240 that analyzes the signals and determines routing of the outgoing call. Depending on the dialed telephone number, the SSP may route the outgoing call immediately over the PSTN 245 to attempt a connection or the SSP may communicate with SCP 260 for further call processing and routing information. The telecommunications system 200 may include wired, optical, and/or wireless elements and may further include private network elements, such as private branch exchanges (PBXs), and/or other elements (not shown). The PSTN 245 includes Advanced Intelligent Network (AIN) componentry controlling many features of the network. The PSTN 245 or switch 235 could also include a packet-based "soft switch" that uses software control to provide voice, video, and/or data services by dynamically changing its connection data rates and protocols types. If the PSTN 245 or switch 235 should include a softswitch, the AIN componentry is replaced by an application server that interfaces with the softswitch via a packet protocol, such as Session Initiation Protocol (SIP). The signaling between the computer system 100, the switch 235, the PSTN 245 including AIN componentry, and the data network 275, however, are well understood in by those of ordinary skill the art and will not be further described. Further, those of ordinary skill in the art will be able to apply the principles of this invention to their own network configurations which may differ substantially from the telecommunications system shown in the figures.

ICW DataServer 250 communicates with SCP 260 and Intranet 265 to effectively provide ICW services to users of the PSTN 245 so that ICW can be activated, de-activated, administered by the telecommunications provider, and controlled or managed by the subscribing customer, user, or other entity with authorization. Thus, ICW DataServer 250 functions as a computer server and database dedicated to managing ICW services over data network 275 and PSTN 245. ICW DataServer 250 communicates with the data network 275 using standard transmission control protocol and Internet protocol (TCP/IP). Further, the ICW Messaging Module 110, may be downloaded from ISP 270, ICW DataServer 250, Intranet 265, or provided on a storage media (e.g., diskette, CD-ROM, or installed by the computer system manufacturer) to a subscribing customer or user to install on the computer system 100 to enable, disable, and further control a variety of the ICW services (e.g., providing call handling options, such as routing an incoming call to voicemail, for incoming calls during the ICW session and data connection), including ICW Messaging Services (e.g., allowing the user to customize presentation and features of the incoming message(s) and/or response message(s) and allowing the user to control how the data connection is interrupted, etc.).

In an embodiment, the ICW Messaging Module 10 is used to establish an ICW Messaging Profile 255. The ICW DataServer 250 stores a database of ICW Messaging Profiles 252. The customer interacts with the ICW Messaging Module 10 and with Intranet 265 to access and login to the ICW DataServer and to establish the ICW Messaging Profile 255. The ICW Messaging Profile 255 could contain a variety of fields and/or files associated with at least one of the following: ISP Login information, password entered by the user, telephone number of the subscribing customer, profile of a communications device associated with a telephone number of the calling party (e.g., if telephone number is associated with a personal digital assistant (PDA) and all incoming calls from PDAs are formatted for text-messaging presentation, then any response message(s) would be formatted for text-messaging), a name associated with the calling telephone number, a time of day, a date identifier (e.g., day of week or calendar date), other information associated with the ICLID signal, length and/or duration of ICW message(s), display of GUI (e.g., color, font, placement of ICW Messaging Module on screen, etc.), whether to bookmark a site associated with the active data connection or save information prior to connecting message, and other selections related to ICW messaging presentation, features, and managing the data connection during ICW messaging. Alternatively, the customer could interact with the ICW Messaging Module 110 and with the Data Network 275 to access and login to the ICW DataServer and to establish the ICW Messaging Profile 255.

In an embodiment, the ICW messaging services may be assigned different levels of access and/or authority for interrupting ICW and the data connection to send the incoming message. For example, Calling Party Mom (i.e., a calling party that is a mother) may have an ICW Messaging Profile associated with her cellular phone number that always allows interruption of ICW services and initiates the ICW messaging services. However, Calling Party Child (i.e., a calling party that is a child) may have an ICW Messaging Profile associated with an access code entered by the child that alerts the user of the computer system that Calling Party Child is trying to send an incoming message and prompts the user of the computer system to accept or to enter an authorization code in order to activate ICW messaging. If the user of the computer system does not accept or enter the authorization code or if the user fails to respond to the authorization prompt within a selected period of time, then the network may default to activate ICW messaging.

Figure 3:
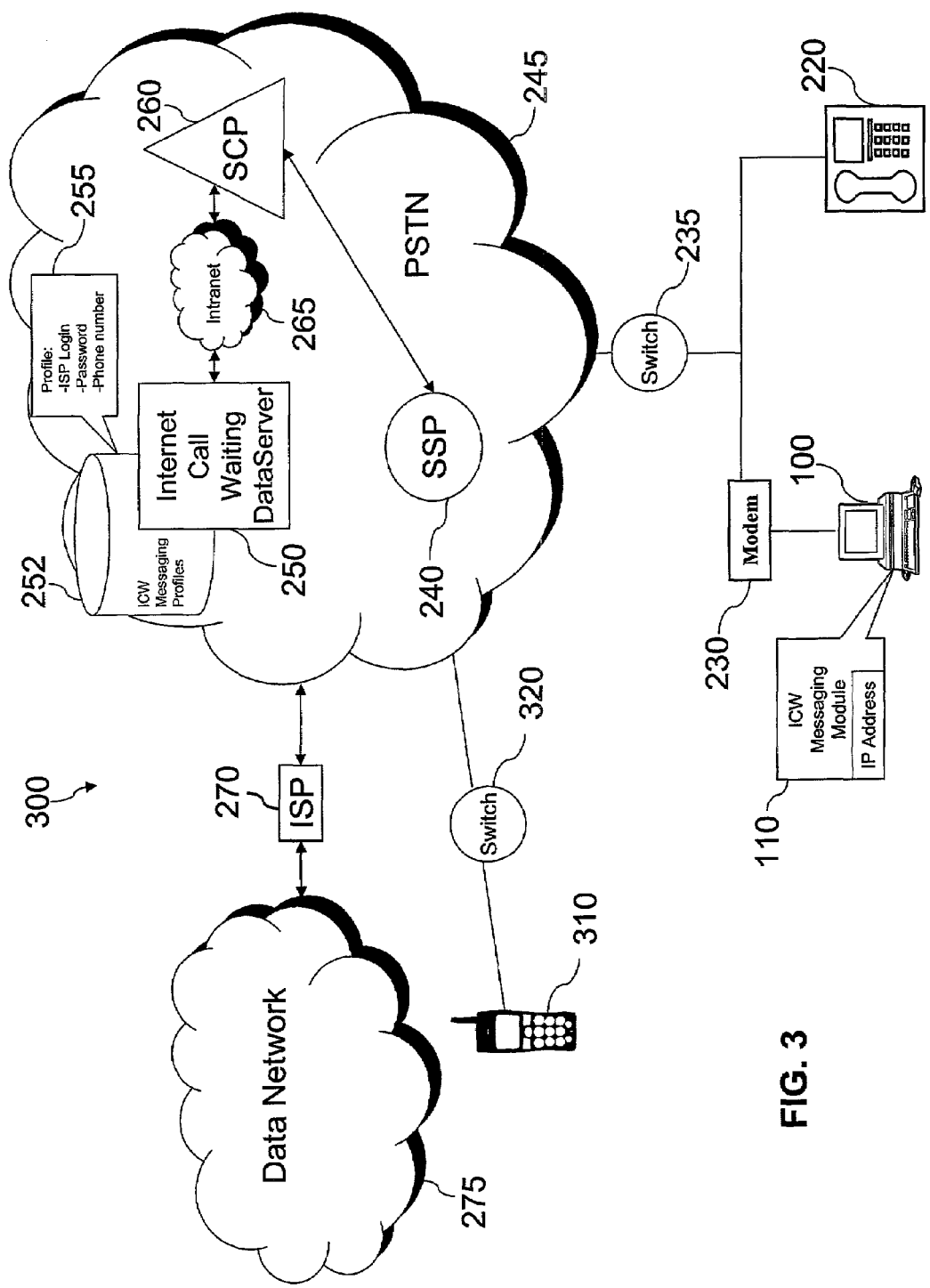
FIG. 3 is a schematic of an incoming call to the telecommunications system shown in FIG. 2.

FIG. 3 illustrates a telecommunications system 300 with an incoming call from a cellular phone 310 that is transmitted to an antenna (not shown) and then coupled to a mobile telecommunications switch 320 and to the PSTN 245. The telecommunications network associates the incoming call to the called telephone number with the computer system 100 and the telephone 220. Because, however, a data connection is already established between the computer system 100 and the data network 275, in an embodiment, the PSTN 245 routes an active ICW session announcement to the cellular phone 310 and prompts the calling party to select ICW messaging or another call-handling option. For example, the ICW session announcement might be an audible communication capable of being played over the cellular phone 310 and communicate that "[t]he party you are calling has activated Internet Call Waiting and has established a data connection with a computer system. Press 1 if you would like to send a message for presentation on the computer system. . . . " Alternatively, the announcement may be presented in a format that utilizes voice, video, and/or data to the cellular phone 310 used by the calling party. In another embodiment, the calling party places an incoming call to the called telephone number, but the calling party is not prompted for a selection to send a message. Rather, the ICW DataServer 250 might look up the calling telephone number in a database of telephone numbers associated with the ICW Messaging Profiles 252. If there is a match, then the matched ICW Messaging Profile could alert the calling party to immediately enter an ICW Message and initiate ICW messaging.

Figure 4:
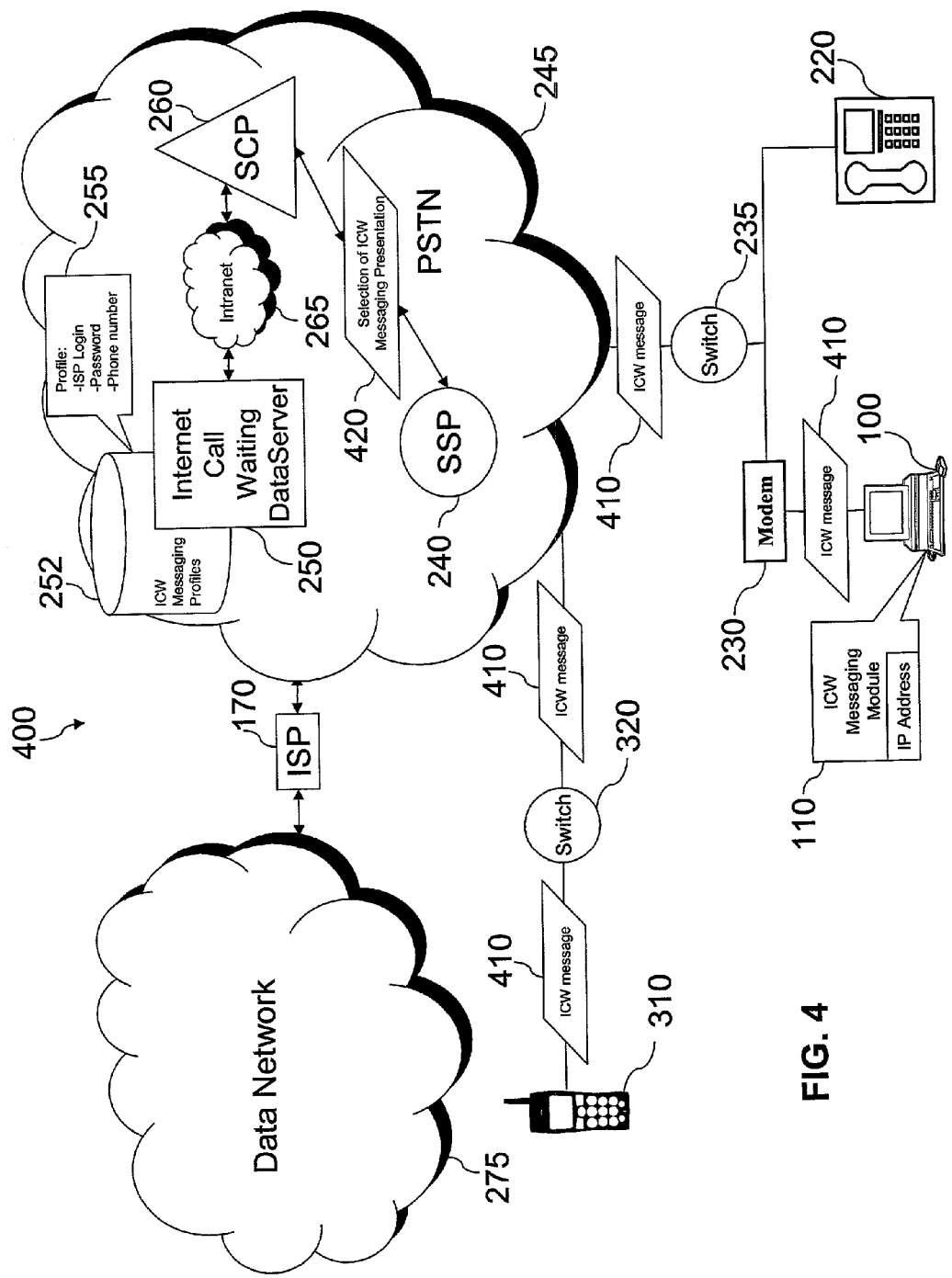
FIG. 4 is a schematic of a telecommunications system illustrating the ICW messaging call flow according to an embodiment of this invention.

FIG. 4 illustrates a telecommunications system 400 similar to the telecommunications system disclosed in FIG. 3. Telecommunications system 400 includes an IP address query of the ICW Messaging Module 110, at least one ICW Message 410, and a Selection of ICW Messaging Presentation 420. FIG. 4 illustrates a query that is made to the ICW Messaging Module for dynamic IP addressing so that the ICW message(s) (e.g., incoming message(s) and response message(s)) can be sent to computer system 100 through the telecommunications network 245. Some Internet Service Providers assign a "static" IP address to a customer's account, whereas other Internet Service Providers dynamically change a customer's IP address. A static IP address is permanently assigned to the customer, while a dynamic IP address may change with each login or may dynamically change during a session. The IP address query is sent from PSTN 245 (typically, via the ICW DataServer 250) to the ICW Messaging Module 110. Alternatively, the IP address query could be sent from PSTN 245, routed over data network 275, and to an ISP IP address map (shown as ref. 730 in FIG. 7) assigned to the computer system. Regardless of how the IP address is accessed, the IP address is returned and communicated to the ICW DataServer 250 of the PSTN 245 so that switch 235 can communicate at least one ICW message(s) 410 to/from the computer system 100 via the IP address of the called telephone number. Incoming and/or response ICW message(s) 410 may be communicated to the computer system 100 or cellular phone 310 using an audio format, text format, video format, and combinations thereof.

Typically, the ICW Messaging call flow through telecommunications system 400 involves the calling party using cellular phone 310 to provide an ICW message 410 that is routed through switch 320 to PSTN 245. PSIN 245 routes the ICW message 410 to the IP address of computer system 100 via switch 235. The ICW Messaging Module 110 presents the ICW message 410 so that the user of the computer system 100 is alerted of the information contained in the ICW message 410. In this embodiment, the user may also enter a response ICW message 410 that is routed through switch 235 to PSTN 245. PSTN 245 may need to further access the ICW DataServer 250 to associate a Selection of ICW Messaging Presentation 420 for the calling party's communications device. The Selection of ICW Messaging Presentation 420 provides fields and/or files that appropriately format the response ICW message so that it can be presented on the cellular phone 310 or any other communications device of the calling party. For example, the response ICW message 410 may be a text-based message that is incapable of being visually displayed by cellular phone 310. Thus, the Selection of ICW Messaging Presentation 420 has the intelligence to associate the presentation capabilities of the calling party's communications device, and, in this example utilizes a commercially available text-to-speech application to transform the text-based message to an audio-based message (e.g., synthesized voice message) that is routed to switch 320 and played to cellular phone 310. Further, the Selection of ICW Messaging Presentation 420 may default to transform or convert all response messages from computer system 100 to audio-based messages if it is unable to associate the presentation capabilities of the calling party's communications device.

Figure 5:
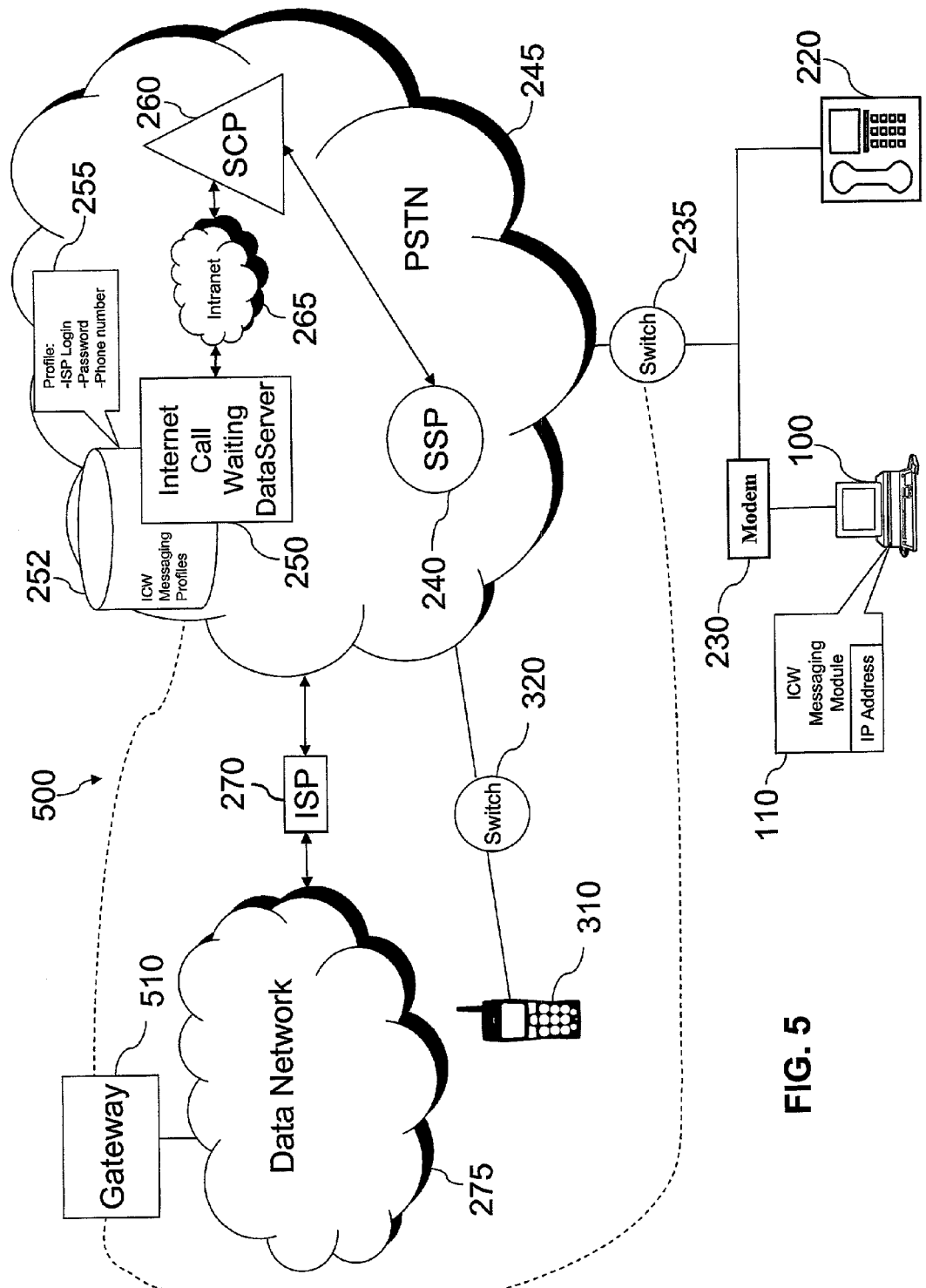
FIG. 5 is a schematic of a telecommunications system showing a gateway of a data network communicating with the computer system engaged in the ICW session and the data connection according to an embodiment of this invention.
Figure 6:
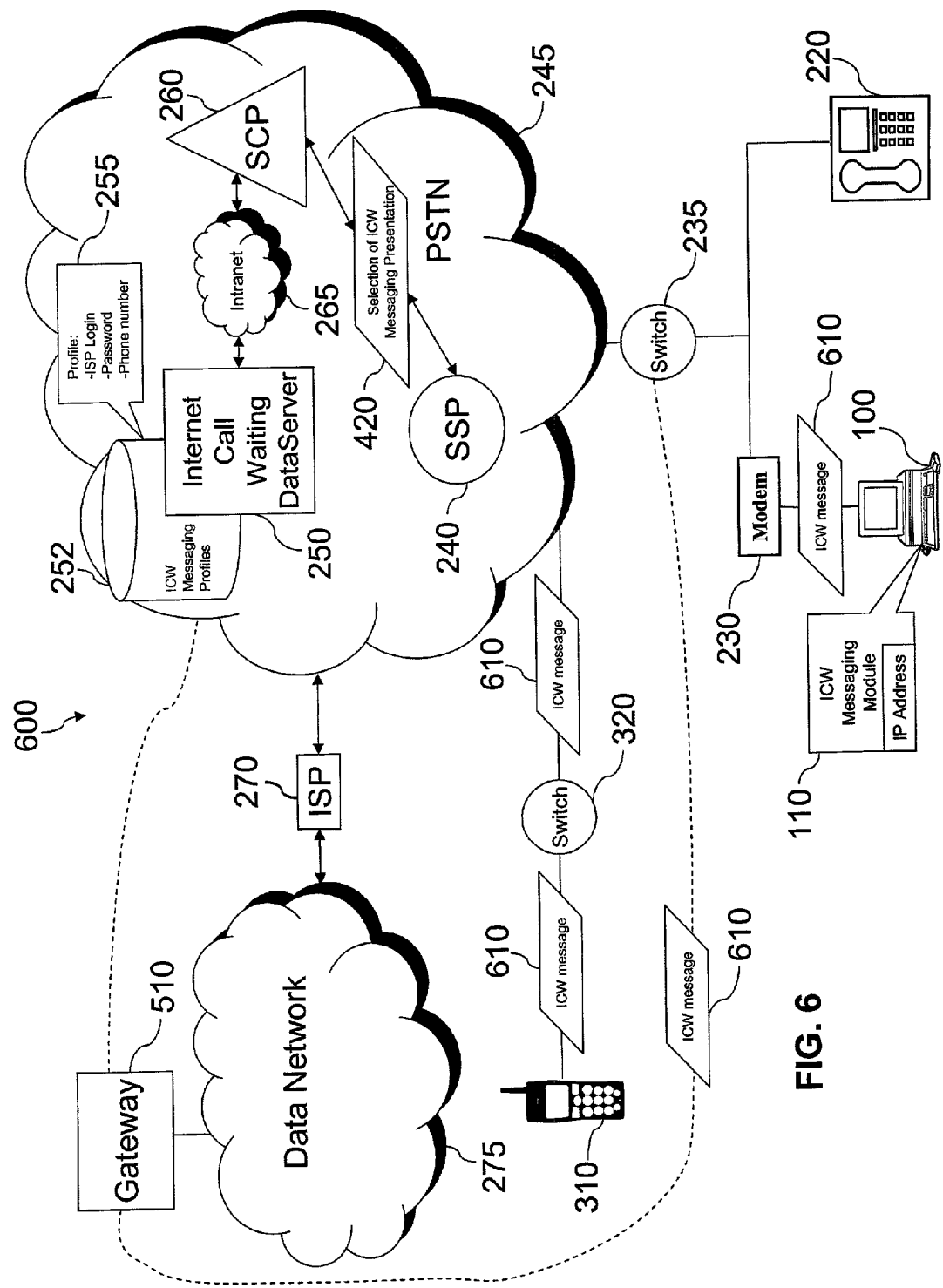
FIG. 6 is a schematic illustrating the ICW messaging call flow through a telecommunications network and the gateway of the data network of the telecommunications system shown in FIG. 5.

In addition to using the PSTN 245 to communicate ICW messaging as described above in FIG. 4, this invention also allows the calling party to communicate ICW messaging via a gateway 510 of the data network 275 shown in FIGS. 5-6. As shown in FIG. 5, telecommunications system 500 routes an incoming call to an IP address of computer system 100 via the gateway 510 communicating with the data network 275. The gateway 510 transmits a communications signal of the incoming call that utilizes the TCP/IP connection of the data network 275 with the computer system 100 so that the incoming call can be broadcast (i.e., presented via voice, video, and/or data/text communications) over the computer system 100. Consequently, the ICW feature that typically cancels call waiting during a data connection to prevent the incoming call from being routed over the PSTN 245 to the computer system 100 is ignored so that the incoming call utilizes the data connection between the computer system 100 and the data network 275 to establish ICW messaging communications between the calling party using cellular phone 310 and the computer system 100.

FIG. 6 illustrates an ICW Messaging call flow through the gateway 510 shown in FIG. 5. Typically, the ICW Messaging call flow through telecommunications system 600 involves the calling party using cellular phone 310 to provide an ICW message 610 that is routed through switch 320 to PSTN 245. PSTN 245 may route the ICW message 610 directly to gateway 510 or may route the ICW message 610 to the gateway 510 via the data network 275 and ISP 270. Regardless of how routed from PSTN 245, the Gateway 510 then routes the ICW message 610 to computer system 100 via switch 235. The ICW Messaging Module 110 presents the ICW message 610 so that the user of the computer system 100 is alerted of the information contained in the ICW message 610. Similar to the embodiment described in FIG. 5, the user may also enter a response ICW message 610 that is routed through switch 235 to gateway 510. Thereafter, the ICW message 610 is routed back to PSTN 245 (either via ICW DataServer 252 or via data network 275 and ISP 270). As described above, PSTN 245 may need to further access the ICW DataServer 250 to associate a Selection of ICW Messaging Presentation 420 for the calling party's communications device. After the response ICW message 610 is transformed or formatted, PSTN 245 routes the response ICW message 610 to switch 320 for presentation by cellular phone 310. The calling party may communicate another ICW message 610 or terminate the communications connection.

Figure 7:
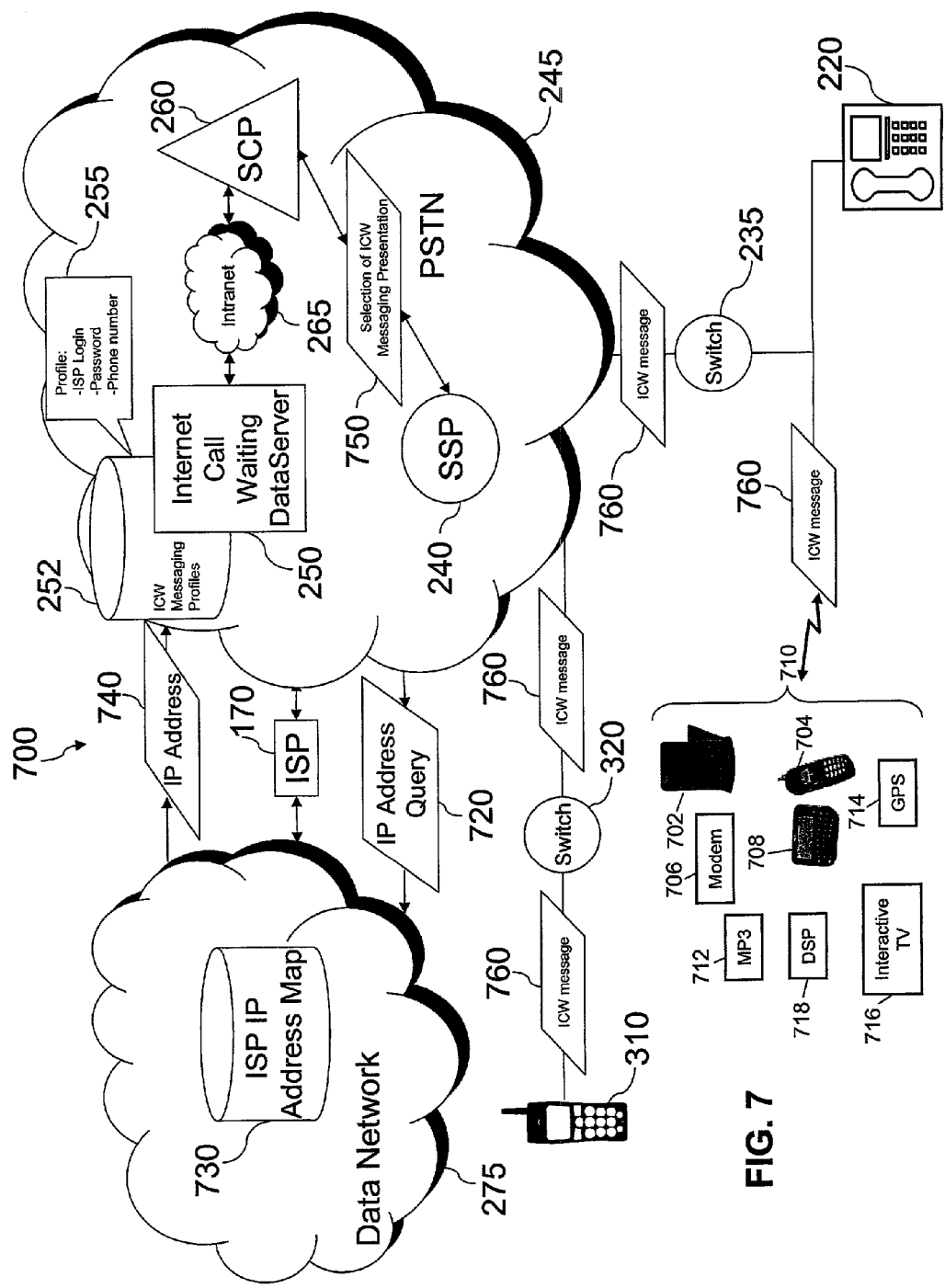
FIG. 7 is a schematic of a telecommunications system illustrating the ICW messaging call flow to alternative IP communications devices according to an embodiment of this invention.

FIG. 7 illustrates a telecommunications system 700 similar to the telecommunications system disclosed in FIG. 4; however, telecommunications system 700 illustrates an ICW messaging call flow for alternate IP communications devices. Telecommunications system 700 includes alternate IP communications devices 710, including a personal digital assistant (PDA) 702, an IP cellular phone 704, a modem 706, an interactive pager 708, an MP3 712, a global positioning system transceiver 714, an interactive television 716, and a digital signal processor 718, an IP address query 720, ISP IP address map 730, a search result with the IP address 740, a Selection of ICW Messaging Presentation 750, and at least one ICW message 760. A query that is made for dynamic IP addressing so that the ICW message(s) (e.g., incoming ICW message(s) and/or a response ICW message(s)) can be sent to at least one of the alternate communications devices 710 through the telecommunications network 245. The IP address query 720 is sent from PSTN 245 (typically, via the ICW DataServer 250), routed over the data network 275, and to an ISP IP address map 730 serving the computer system 100. The IP address query 720 requests the IP address assigned to the alternate IP communications device 710. The IP address, for example, could be mapped to the ISP login information. If the ISP login information contained within the ICW Messaging Profile matches the ISP's login information, then the PSTN 245 could have access to the ISP IP address map 730. Regardless of how the IP address is accessed, the IP address is returned and communicated to the ICW DataServer 250 of the PSTN 245 so that switch 235 can communicate at least one ICW message(s) 760 to/from the alternate IP communications device via the IP address of the called telephone number. Incoming and/or response ICW message(s) 760 may be communicated to the alternate IP communications device 710 or cellular phone 310 using an audio format, text format, video format, and combinations thereof. The Selection of ICW Messaging Presentation 750 operates similar to the description above; however, it additionally provides fields and/or files that appropriately format the incoming ICW message for presentation on the alternate IP communications device 710. Thus, the Selection of ICW Messaging Presentation 750 has the intelligence to associate the presentation capabilities of the alternate IP communications device 710.

Figure 8:
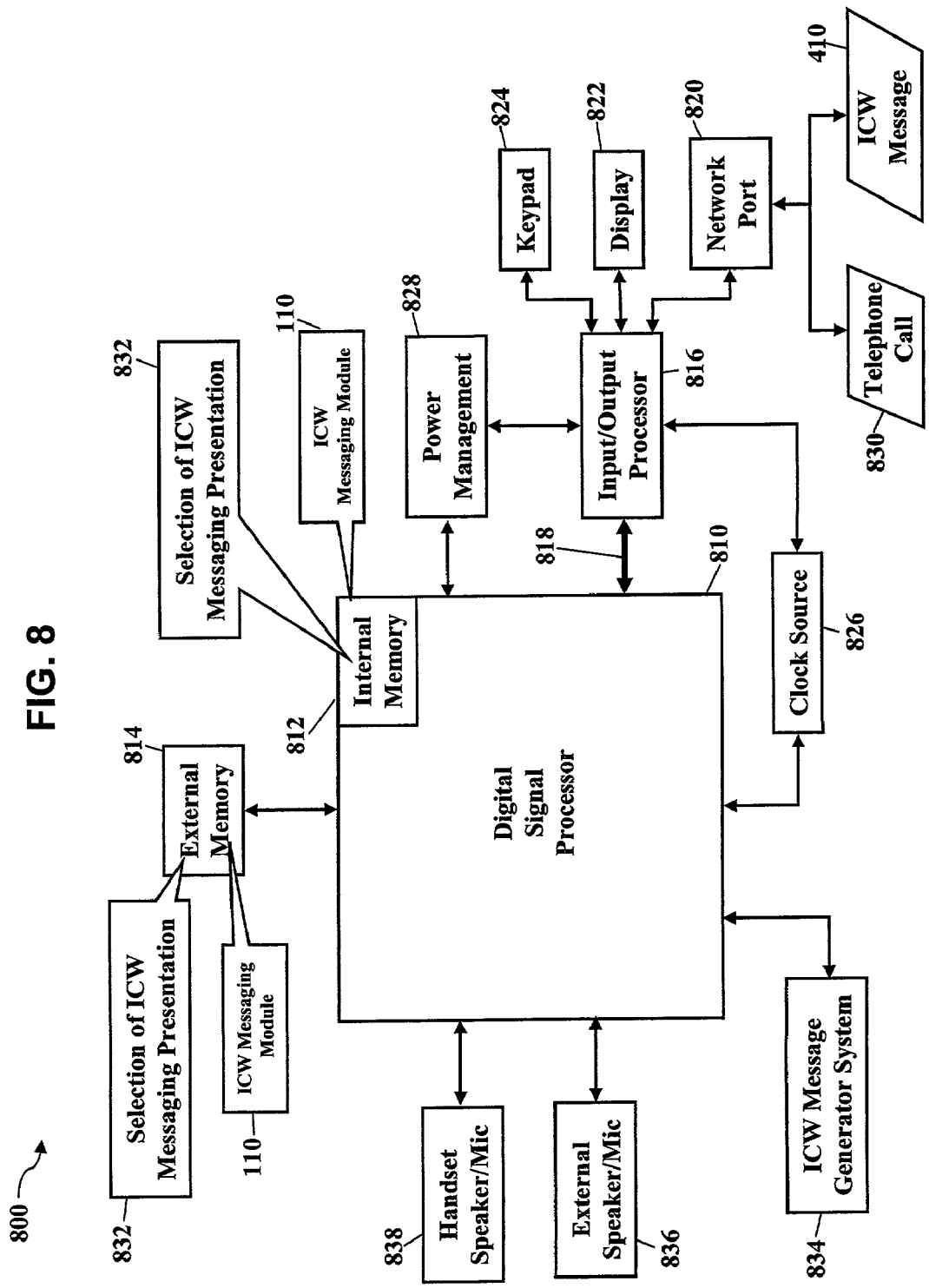
FIG. 8 is a block diagram of an exemplary apparatus that generates or otherwise transforms the incoming message to an audible and/or visual announcement that can be presented by the computer system according to an embodiment of invention.

FIG. 8 is a block diagram of an apparatus 800 embodying this invention. This apparatus generates an ICW messaging presentation for ICW message(s) (incoming and responses) 410 to a called telephone number serviced or coupled with the computer system 100. The apparatus includes the ICW Messaging Module 110 operating within a memory device of a digital signal processor 810. The memory device could include internal memory 812 of the digital signal processor, or the memory device could include an external memory 814 communicating with the digital signal processor 810. The digital signal processor 810 converts analog signals to digital signals and converts digital signals to analog signals. The digital signal processor 810 could include compression and decompression algorithms, cancellation algorithms, audio-processing circuitry, filter circuitry, and amplifier circuitry. Although digital signal processors can be designed to provide differing capabilities and a variety of performance criteria, the basic functions of the digital signal processor are known and, thus, will not be further discussed.

The digital signal processor 810 interfaces with an input/output processor 816. The input/output processor 816 controls system input/output and provides telephony-like control features. A bus 818 provides a signal communication path between the digital signal processor 810 and the input/output processor 816. The input/output processor 816 is a microprocessor that includes memory (not shown), communication controllers (not shown), and peripheral controllers (not shown). The communication controllers, for example, could control packet-based communications with a data network (shown as reference numeral 275 in FIGS. 2-7) through a network port 820. The communication controllers could also control packet-based communications with a telecommunications switch (shown as reference numeral 235 in FIGS. 2-7) through the network port. The peripheral controllers provide an interface with an LCD/LED/CRT display 822 and with telephony-like control features, such as a keypad 824. A clock source 826 provides a system clock for the apparatus 800, and the clock source 826 may also include higher and lower frequency multiples of the system clock depending upon power requirements and power availability. A power management system 828 provides differing power control mechanisms, such as a sleep mode and a low-power mode, to efficiently utilize available power and to reduce thermal management concerns.

The apparatus 800 generates the ICW messaging presentation for the incoming ICW message. If, for example, the apparatus 800 communicates with the telecommunications switch (shown as reference numeral 235 in FIGS. 2-7), the ICW Messaging Module 110 causes the apparatus 800 to visually or audibly alert a nearby customer or user of the incoming ICW message. The network port 820 receives the ICW message 410 via a communications link to the telecommunications switch (shown as reference numeral 235 in FIGS. 2-7). The ICW message 410 may include information associated with an ICW Messaging Profile. When the ICW Message 410 is received, the digital signal processor 810 interfaces with the ICW Messaging Module 110 and with the internal memory 812 and/or the external memory 814. The ICW Messaging Module 110 instructs the digital signal processor 810 to retrieve the selected ICW messaging presentation format from a Selection of ICW Messaging Presentations 832 stored in the memory device. Alternatively, the ICW messaging presentation format may be stored in the telecommunications network (shown as reference numeral 245 in FIGS. 2-7) or in the data network (shown as reference numeral 275 in FIGS. 2-7). The presentation format is then selected based upon the information contained within the ICW Messaging Module 110 and/or ICW Messaging Profile as previously discussed.

Once the presentation format is selected, the apparatus 800 generates the ICW message 410. The digital signal processor 810 interfaces with an ICW Message Generator System 834. The ICW Message Generator System 834 executes the selected presentation format, populates associated fields and/or files, and presents the ICW message 410. The digital signal processor 800 and the ICW Message Generator System 834 interface with an external speaker/microphone (mic) system 836 and/or with a visual display device 822 to audibly and/or visually present the ICW message 410.

Figure 9:
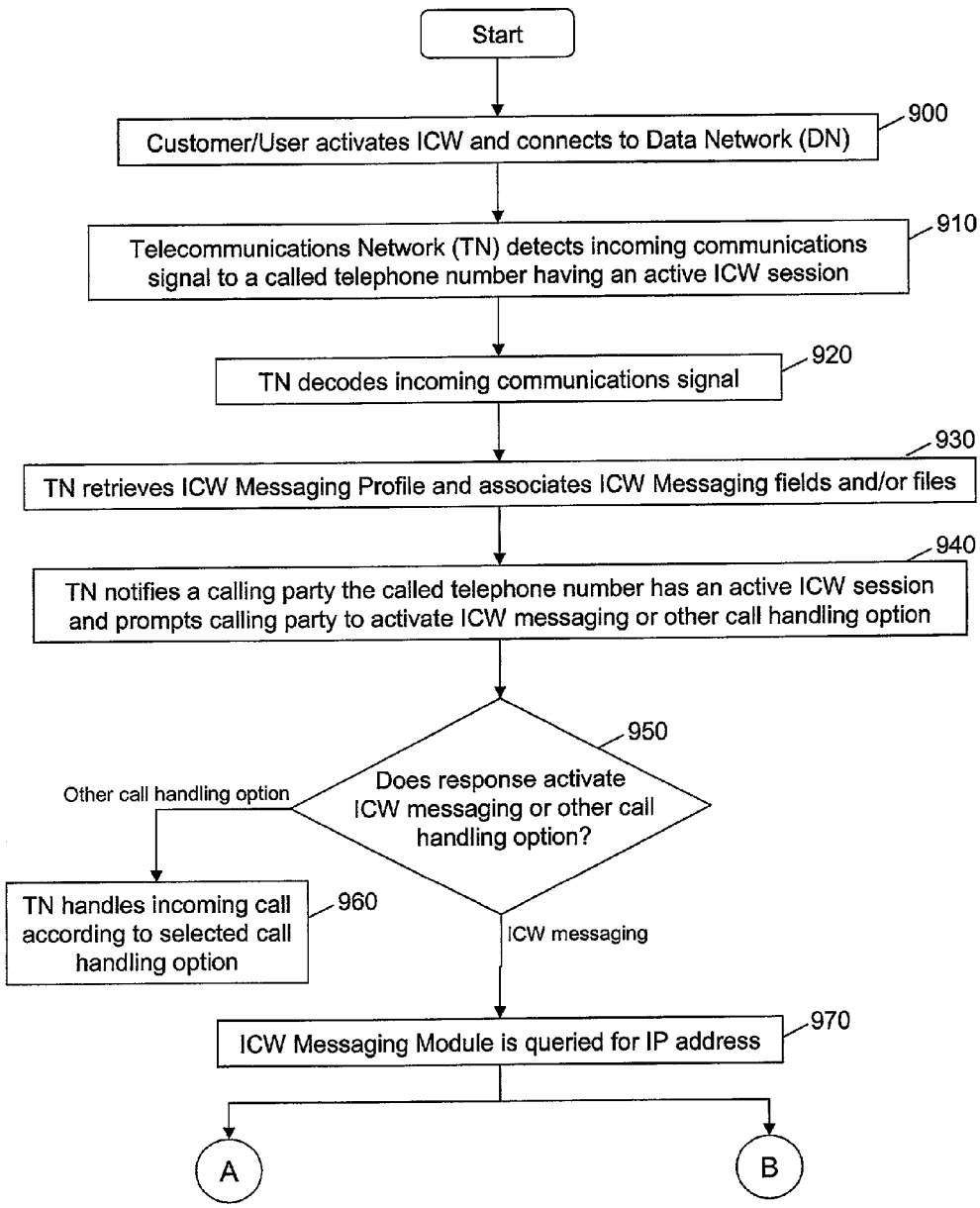
FIGS. 9-11 are flowcharts illustrating several ICW Messaging methods associated with the telecommunications system architects depicted in FIGS. 2-6.
Figure 10:
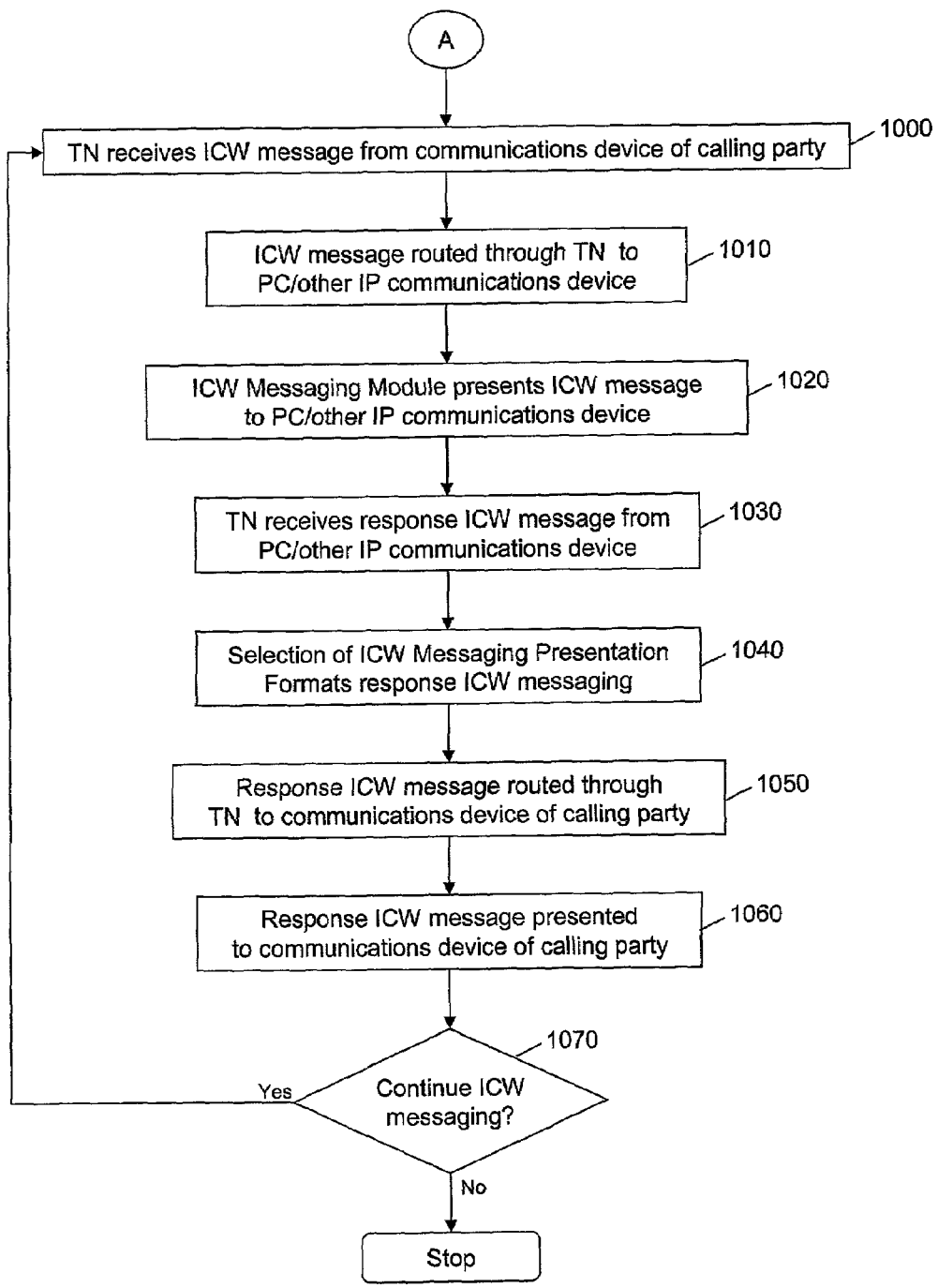
Figure 11:
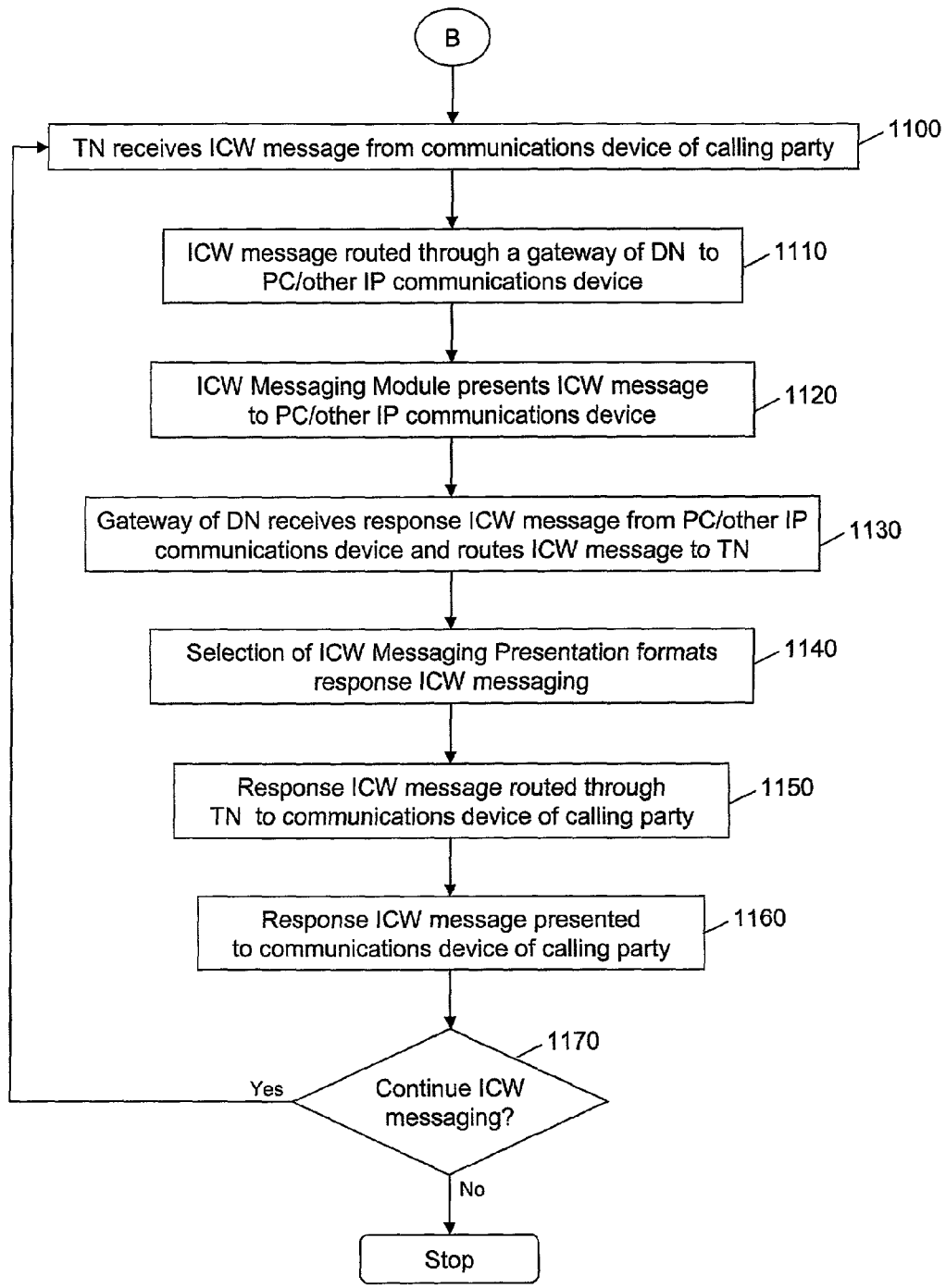

FIGS. 9-11 illustrate a flowchart showing an overview of a process for ICW Messaging Services according to an embodiment of this invention. While the processes in FIGS. 9-11 are shown in series, these processes may occur in different orders and/or at simultaneous times as one of ordinary skill in the art will understand.

Referring now to FIG. 9, a customer or user activates ICW and connects to a data network (block 900). A telecommunications network (TN) detects an incoming communications signal to a called telephone number having an active ICW session and data connection (block 910). The telecommunications network decodes the incoming communications signal (block 920) and retrieves an ICW Messaging Profile to associates ICW Messaging fields and/or files (block 930). Thereafter, the telecommunications network notifies a calling party that the called telephone number has an active ICW session and data connection and prompts the calling party to activate ICW messaging or another call handling option (block 940). For example, the telecommunications network may play an audible announcement to the calling party that "The party you are calling has activated Internet Call Waiting and has established a data connection. Press 1 if you would like to send a message over the data connection. . . . " Thereafter, the telecommunications network receives a response to either activate ICW messaging or another call handling option (block 950). If the calling party chooses another call handling option (e.g., leaving a voice message), then the telecommunications network handles the call accordingly (block 960). If, however, the calling party chooses to activate ICW messaging, then the ICW Messaging Module is queried for an IP address (block 970). Alternatively, an ISP IP Address Map could also be queried for an IP address (not shown). ICW Messaging Service may then be activated (1) over the telecommunications network (as shown in FIG. 10) or (2) over the data network (as shown in FIG. 11). By allowing both network architects, ICW Messaging Services may be dynamically implemented in case the data connection is disconnected due to a transmission error, delay over the data connection, problems at the ISP, software errors, or the like.

If the telecommunications network is utilized, then the method continues with FIG. 10. The telecommunications network receives the ICW message from the communications device of the calling party (block 1000) and routes the ICW message to the PC or other IP communications device (block 1010). The ICW Messaging Module of the PC of other IP communications device presents the ICW message (block 1020). Thereafter, in this embodiment, the user chooses to send a response ICW message (not shown). The telecommunications network receives the response ICW message (block 1030) and formats the response ICW message according to a selection of ICW messaging presentation formats associated with a calling party's communications device (block 1040). Next, the formatted response ICW message is routed to the communications device of the calling party (block 1050) and is presented over the communications device (block 1060). Finally, a decision is made whether to continue ICW messaging or not (e.g., terminate call, leave a voice message, or another call handling option) (block 1070). If ICW messaging continues, then steps 1000-1070 may be repeated. Otherwise, the call is processed according to another call handling option (not shown in figure).

If the data network is utilized, then the method continues with FIG. 11. The telecommunications network receives the ICW message from the communications device of the calling party (block 1100) and routes the ICW message through the gateway of the data network to the PC or other IP communications device (block 1110). The ICW Messaging Module of the PC of other IP communications device presents the ICW message (block 1120). Thereafter, in this embodiment, the user chooses to send a response ICW message (not shown). The gateway of the data network receives the response ICW message and routes the response ICW message to the telecommunications network (block 1130). The telecommunications network formats the response ICW message according to a selection of ICW messaging presentation formats associated with a calling party's communications device (block 1140). Next, the formatted response ICW message is routed to the communications device of the calling party (block 1150) and is presented to the communications device (block 1160). Finally, a decision is made whether to continue ICW messaging or not (e.g., terminate call, leave a voice message, or another call handling option) (block 1170). If ICW messaging continues, then steps 1100-1170 may be repeated. Otherwise, the call is processed according to another call handling option (not shown in figure).

While several exemplary implementations of embodiments of this invention are described herein, various modifications and alternate embodiments will occur to those of ordinary skill in the art. For example, the ICW Messaging Module 110 discussed above may be physically embodied on or in a computer-readable medium, such as a CD-ROM, DVD, tape, cassette, floppy disk, memory card, and large-capacity disk (such as IOMEGA®, ZIP®, JAZZ®, and other large-capacity memory products). This computer-readable medium, or media, could be distributed to end-customers, licensees, and assignees. These types of computer-readable media, and other types not mention here but considered within the scope of this invention (such as an Internet file that could be downloaded to the PC), allow the ICW Messaging Module 110 to be easily disseminated. Accordingly, this invention is intended to include those other variations, modifications, and alternate embodiments that adhere to the spirit and scope of this invention.

What is claimed is:

1. A method, comprising:
processing a call from a calling number to a called number, the called number being busy as a result of an established connection to a data network;
notifying the calling number that the called number is engaged in an online session;
prompting the calling number to activate an Internet Call Waiting messaging service, the Internet Call Waiting messaging service enabling Internet Call Waiting messages to be exchanged between the called number and the calling number over the established connection;
receiving an Internet Call Waiting message from the calling number;
interrupting the online session; and
routing the internet Call Waiting message over the established connection to an Internet Protocol address associated with the called number.

2. The method of claim 1, further comprising:
receiving a called party's response message to the Internet Call Waiting message; and
sending the called party's response message to the calling number.

3. The method of claim 2, further comprising formatting the called party's response message to suit a calling party's device.

4. The method of claim 1, further comprising querying for the Internet Protocol address associated with the called number.

5. The method of claim 1, further comprising receiving an instruction from a calling party to interrupt the online session.

6. The method of claim 5, wherein in response to the calling party's instruction, storing a bookmark to a website address associated with the online session.

7. The method of claim 6, further comprising interrupting the connection to the data network.

8. The method of claim 7, further comprising:
routing the call to the called number, and
when the call is completed, reestablishing the connection to the data network and to the bookmarked website address.

9. A system, comprising:
means for processing a call from a calling number to a called number, the called number being busy as a result of an established data connection to a data network;
means for notifying the calling number that the called number is engaged in an online session;
means for prompting the calling number to activate an Internet Call Waiting messaging service, the Internet Call Waiting messaging service enabling Internet Call Waiting messages to be exchanged between the called number and the calling number over the established connection;
means for receiving an Internet Call Waiting message from the calling number,
means for interrupting the online session; and
means for routing Internet Call Waiting message over the established connection to an Internet Protocol address associated with the called number.

10. The system of claim 9, further comprising:
means for receiving a called party's response message to the Internet Call Waiting message; and
means for sending the called party's response message to the calling number.

11. The system of claim 10, further comprising means for formatting the called party's response message to suit a calling party's device.

12. The system of claim 9, further comprising means for queryng for the Internet Protocol address associated with the called number.

13. The system of claim 9, further comprising means for receiving an instruction from a calling party to interrupt the online session.

14. The system of claim 13, wherein in response to the calling party's instruction, means for storing a bookmark to a website address associated with the online session.

15. The system of claim 14, further comprising means for interrupting the connection to the data network.

16. A computer readable medium storing processor-executable instructions for:
processing a call from a calling number to a called number, the called number being busy as a result of an established data connection to a data network;
notifying the calling number that the called number is engaged in an online session:
prompting the calling number to activate an Internet Call Waiting messaging service, the internet Call Waiting messaging service enabling Internet Call Waiting messages to be exchanged between the called number and the calling number over the established connection;
receiving an internet Call Waiting message from the calling number;
interrupting the online session; and
routing Internet Call Waiting message over the established connection to an Internet Protocol address associated with the called number.

17. The computer readable medium of claim 16, further comprising instructions for:
receiving a called party's response message to the Internet Call Waiting message; and
sending the called party's response message to the calling number.

18. The computer readable medium of claim 16, further comprising instructions for:
receiving an instruction from a the calling party to interrupt the online session;
responsive to the calling party's instruction, storing a bookmark to a website address associated with the online session;
interrupting the connection to the data network;
routing the call to the called number; and
when the call is completed, reestablishing the online session to the bookmarked website address.

19. The computer readable medium of claim 16, further comprising instructions for formatting the called party's response message to suit a calling party's device.

20. The computer readable medium of claim 16, further comprising instructions for:
ignoring an Internet Call Waiting feature that cancels call waiting during the connection to the data network; and
utilizing the data connection to route the call to the called number.

* * * * *